United States Patent [19]

Nemoto et al.

[11] Patent Number: 4,459,007
[45] Date of Patent: Jul. 10, 1984

[54] APPARATUS FOR REFLECTION PHOTOMETRY OF A SINGLE LENS REFLEX CAMERA

[75] Inventors: Kazuyuki Nemoto; Kazunori Mizokami, both of Hachioji, Japan

[73] Assignee: Olympus Optical Company Ltd., Japan

[21] Appl. No.: 386,022

[22] Filed: Jun. 7, 1982

[30] Foreign Application Priority Data

Aug. 18, 1981 [JP] Japan .......................... 56-122449[U]

[51] Int. Cl.³ ............................................. G03B 7/083
[52] U.S. Cl. ..................................... 354/459; 354/480
[58] Field of Search ................. 354/31, 49, 50, 51, 354/59, 459, 480

[56] References Cited

U.S. PATENT DOCUMENTS 3,687,026 8/1972 Kobayashi et al. .
4,064,517 12/1977 Maitani et al. ...................... 354/51
4,295,720 10/1981 Mizokami et al. ................... 354/51
4,367,022 1/1983 Yamasaki .......................... 354/51 X

FOREIGN PATENT DOCUMENTS 53-37222 10/1978 Japan .

*Primary Examiner*—William B. Perkey
*Attorney, Agent, or Firm*—Ostrolenk, Faber, Gerb & Soffen

[57] ABSTRACT

An apparatus for reflection photometry of a single lens reflex camera includes a first shutter blind, the surface of which exhibits a reflectivity which is nearly one-half the reflectivity of a film surface. During the time a photoelectric transducer element, used for photometry, receives light reflection from the surface of the first blind, an output from a photometric circuit is doubled so as to be substantially equal to the output produced when the transducer element receives light reflection from the film surface during the running of the first blind.

4 Claims, 5 Drawing Figures

APPARATUS FOR REFLECTION PHOTOMETRY OF A SINGLE LENS REFLEX CAMERA

BACKGROUND OF THE INVENTION

The present invention relates to an apparatus for reflection photometry of a single lens reflex camera, and more particularly, to such an apparatus which is used in a single lens reflex camera to determine the amount of light from an object being photographed which transmits through a taking lens and which is reflected by the surface of a first blind of a focal plane shutter and by a film surface which is exposed as the first blind runs.

A single lens reflex camera of reflection photometry type which utilizes the so-called TTL (through-the-lens) direct photometry is illustrated in FIG. 1. Specifically, there is shown a movable reflecting mirror 1, below which a taking light path is defined and leads to a focal plane shutter including a first blind 2 and to a film 3 located behind the shutter. A photoelectric transducer element 4 which is used for the purpose of photometry is mounted on a baseplate 5 so as to be in opposing relationship with the first blind 2 and the film 3 while avoiding an interference with the taking light path. Before the movable mirror 1 moves upward to the position shown from a phantom line position 1A, the light passing through a taking lens 9 is reflected by the mirror 1 to pass through a focussing glass 6, pentaprism 7 and eyepiece 8 sequentially for observation by a photographer. However, at the same time as the movable mirror 1 moves upward to the position shown, the light from an object being photographed is directed onto the first blind 2, which reflects to redirect it onto the transducer element 4. As the first blind 2 begins to run, the film 3 becomes exposed, whereby its photosensitive surface also reflects light to the transducer element 4. In this manner, the transducer element 4 determines light reflection from the first blind 2 and the film 3 to provide a photometry output which is utilized to control an exposure.

As is well recognized, when a focal plane shutter of the blind type is utilized, the photosensitive film surface is initially covered by the first blind which is formed of a black cloth. As the first blind runs in response to a shutter release operation, the film surface becomes exposed, and after a time interval corresponding to a proper exposure period, a second blind of the shutter which is again formed by a black cloth begins to run to cover the film surface again. It will thus be seen that the amount of light reflection onto the transducer element 4 varies between the blind surface and the film surface because of their differential reflectivities. Hence, if a photocurrent produced by the transducer element 4 and which is proportional to the amount of light input is directly integrated, an exact exposure period cannot be derived.

To accommodate for this problem, in a conventional reflection photometry apparatus, light reflection from both the first blind surface and the film surface are determined and are subjected to a correction process to eliminate any photometric error which results from differential reflectivities, before an exposure period is determined. However, the use of a black cloth for the blinds of the shutter results in a very low reflectivity of the blind surface, and hence the transducer element 4 produces a photocurrent of a low level when it receives light reflection from the blind surface. Accordingly, such photocurrent is susceptible to the influences of noises and leakage current even if the photocurrent output from the transducer element 4, when receiving the light reflection from the blind surface, is amplified in order to provide a correction of a corresponding photometric output so as to compensate for a difference in the reflectivity between the blind and film surfaces, because the noises and leakage current are also amplified, thus preventing a photometric output to be obtained which correctly reflects the brightness of an object being photographed. In addition, an electric circuit which is used to provide such correction is complex because of a large difference in the reflectivity between the blind surface and the film surface and because such difference does not remain constant.

In another reflection photometry apparatus, the surface of the first blind is printed with a patterned material having the same reflectivity as the film surface so that the reflectivity which the first blind surface exhibits is substantially equal to that of the film surface. This allows a uniform photocurrent to be produced by the transducer element 4 which is independent from the position assumed by the first blind during its running. However, the interior of a camera is usually provided with a black delustering painting in order to reduce stray ray within a mirror box and to prevent the occurrence of light leakage to the film or ghost and flare. Thus, forming the blind surface in the manner mentioned above in order to achieve the same degree of reflectivity as the film surface interferes with such light extinguishing effect, and may cause the occurrence of ghost or flare. Accordingly, such a reflection photometry apparatus is not a desirable one.

Thus it will be evident that it is undesirable that the shutter blind of the reflection photometry apparatus has a reflectivity which is either excessively high or low as compared with the reflectivity of the film surface. Also it is desirable that a photometric circuit which compensates for an exposure error resulting from differential reflectivities be constructed as simple as possible.

SUMMARY OF THE INVENTION

In view of the foregoing, it is an object of the invention to provide an apparatus for reflection photometry of a camera in which the surface of the first blind of a shutter is constructed to exhibit a reflectivity which is nearly one-half the reflectivity of a film surface and in which a photometric circuit is arranged to provide an output when an associated photoelectric transducer element receives light reflection from the first blind surface which is equal to twice the output produced thereby when the transducer element receives light reflection from the film surface as the first blind runs.

In accordance with the invention, the surface of the first blind of the shutter is constructed to exhibit a reflectivity which is nearly one-half the reflectivity of a standard film surface. This avoids the influence of noises or leakage current which might occur when a black cloth is used for the blind. In particular, a correct exposure is assured when an object being photographed is under a low illumination and the exposure takes a long time. The occurrence of stray ray within a mirror box, light leakage to the film, ghost or flare is prevented. An output from a photometric circuit is doubled from the initiation of running of the first blind to an intermediate point of running so that such output is substantially equal to the magnitude of a subsequent photometric output. This advantageously simplifies the design and construction of the circuit.

DESCRIPTION OF PREFERRED EMBODIMENTS

Figure 1:
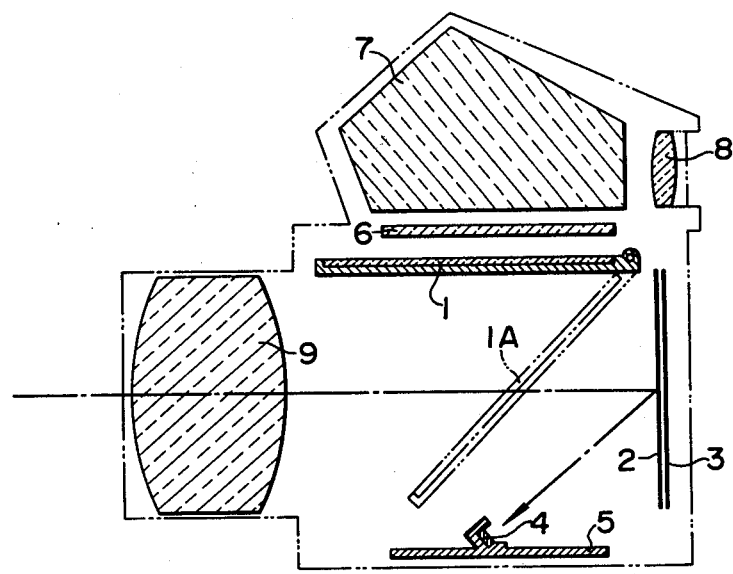
FIG. 1 is a schematic cross section of a single lens reflex camera of reflection photometry type to which the invention may be applied.
Figure 2:
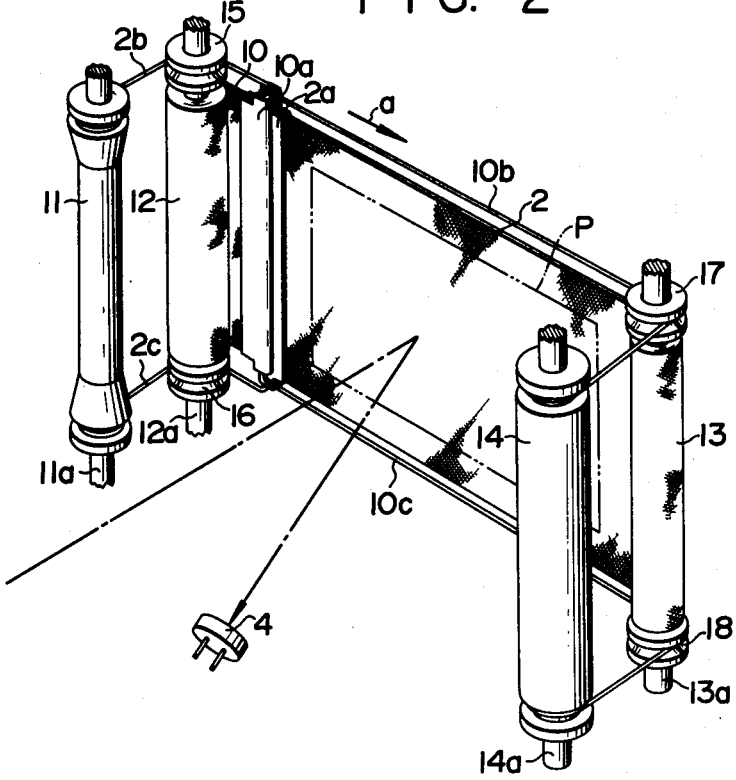
FIG. 2 is a perspective view of a focal plane shutter which is used in the reflection photometry apparatus of the invention.

Referring to FIG. 2, there is shown a perspective view of a focal plane shutter which is used in a reflection photometry apparatus of the invention. A photoelectric transducer element 4 which is adapted to receive light from an object being photographed as it is reflected is below a movable reflecting mirror 1 so as to avoid interference with a taking light path. Its light receiving surface is directed toward the focal plane of a taking lens 9 (see FIG. 1), that is, toward a shutter blind surface and a film surface located behind it within a picture frame P. The focal plane shutter includes a first blind 2 which is disposed nearer the film surface, and also includes a second blind 10 which is disposed in front of the first blind 2. The first blind 2 is adapted to run in a direction indicated by an arrow a along the front side of the film surface. More specifically, the right-hand edge of the first blind 2 is anchored to a first blind take-up drum 13 and a portion thereof adjacent to the right-hand edge is wrapped around drum 13 before the remainder is pulled to the left so as to cover the image field. A cap 2a is fitted over the left-hand edge of the first blind 2 to define one side of an exposure slit. Connected to the upper and the lower end of the cap 2a are one end of a pair of first blind pulling upper and lower strings 2b, 2c, which extend around pulleys 15, 16, respectively. and which have their other end wound around a first blind winding drum 11 before they are anchored thereto.

The left-hand or trailing edge of the second blind 10 is anchored to a second blind winding drum 12 and thereafter wrapped therearound before the remainder is pulled to the right so as to cover the image field. A cap 10a is fitted over the right-hand or leading edge of the second blind to define the other side of the exposure slit. Connected to the upper and the lower end of the cap 10a are one end of a pair of second blind pulling upper and lower strings 10b, 10c, which extend around pulleys 17, 18, respectively, and which have their other end wound around a second blind take-up drum 14 before they are anchored to the drum 14.

The drums and 11, 12, 13 and 14 are rotatably mounted on shafts 11a, 12a, 13a and 14a, respectively, and the both takeup drums 13, 14 internally house a coiled drive spring (not shown) which is charged in response to a film and a shutter winding operation to provide a bias which normally urges these drums in a direction to take up the respective shutter blinds, namely, in the direction of the arrow a. Both winding drums 11, 12 contain a winding mechanism, not shown, on the lower portion of the respective shafts 11a, 12a. The pulleys 15, 16, 17 and 18 are rotatably mounted on the shafts 12a, 13a above and below the both drums 12, 13, respectively.

When the shutter is charged, the winding mechanisms (not shown) cause the shafts 11a, 12a to rotate counterclockwise, whereby the substantial portion of the second blind 10 except for the cap 10a is disposed on the winding drum 12 while the first blind 2 extends to cover the film surface across the picture frame P, with its cap 2a disposed in overlapping relationship with the cap 10a, as shown in FIG. 2.

Figure 3:
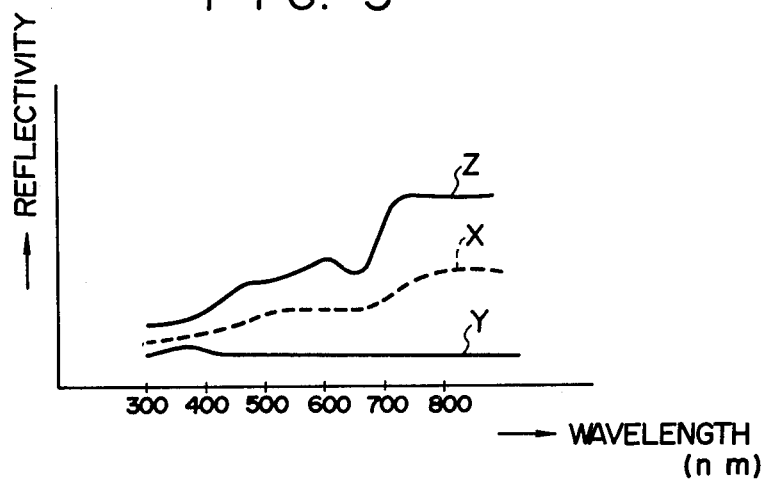
FIG. 3 graphically illustrates the spectral reflectivity of the reflecting surfaces of a first blind and a film.

The front surface of the first blind 2 which is located opposite to the transducer element 4 is painted with a material having a reflectivity which is nearly one-half the reflectivity of a standard color film surface, as by patterned printing. Consequently, the first blind surface exhibits a reflectivity which is nearly one-half the reflectivity of the color film surface. As a result of treating the reflecting surface of the first blind 2 in this manner, it exhibits a spectral reflectivity with respect to light having wavelengths from 300 to 800 nm as indicated by a reflectivity response X shown in broken lines in FIG. 3 which is substantially midway between a reflectivity response Y shown in solid line which represents the reflectivity of a non-treated black blind surface and a reflectivity response Z of a standard color film surface, over the entire region of wavelengths, and which is substantially lower than the reflectivity response Z by nearly −1 EV.

Consequently, when the shutter is charged and the first blind 2 completely covers the film surface across the picture frame P as shown in FIG. 2, reflection onto the transducer element 4 of light from an object being photographed which passes through the taking lens will be increased as compared with that achieved by the use of a first blind which is formed by a black cloth, thereby increasing the light level incident on the transducer element 4. However, because the reflectivity of the blind surface is less than the reflectivity of the film surface substantially by 1 EV, the light which is reflected from the first blind surface cannot cause stray ray within a mirror box, light leakage to the film 3, ghost or flare. The transducer element 4 may comprise a semiconductor element such as SPD or GaAsP, but the use of GaAsP which has a reduced sensitivity to longer wavelengths is effective to maintain a constant offset in the reflectivity between the first blind surface and the film surface.

Figure 4:
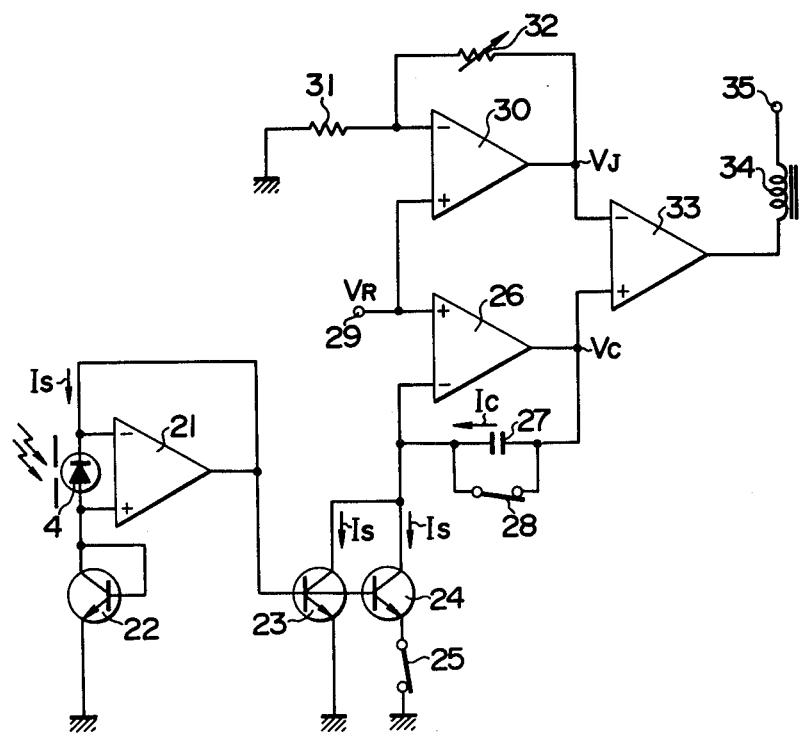
FIG. 4 is a circuit diagram of an electrical circuit used in the reflection photometry apparatus according to one embodiment of the invention.

FIG. 4 is a circuit diagram of an electrical circuit used in a reflection photometry apparatus according to one embodiment of the invention. Specifically, the anode and the cathode of the transducer element 4 are connected to the non-inverting and the inverting input terminal of an operational amplifier 21. The non-inverting input terminal is connected to the collector of an NPN transistor 22 which has its collector connected with its base to act as a diode for providing logarithmic compression. The transistor 22 has its emitter connected to the ground, and the inverting input terminal of the amplifier 21 is connected to an output terminal thereof. The output terminal is connected to a pair of NPN transistors 23, 24 which form a current mirror circuit and which provide logarithmic expansion. The purpose of these transistors is to switch the level of a photometric output from the amplifier 21 in the course of running of the first blind. Specifically, the output terminal of the amplifier 21 is connected to the bases of the transistors 23, 24, and the emitter of the transistor 24 is connected to the ground while the emitter of the transistor 24 is connected to the ground through a trigger switch 25, which is opened in the course of running of the first blind 2. It is to be noted that the transistors 23, 24 exhibit the same response as the transistor 22. The collectors of the transistors 23, 24 are connected in common and connected to the inverting input terminal of an operational amplifier 26. An integrating capacitor 27 is connected across the inverting input terminal and the output terminal of the amplifier 26, which therefore acts as an integrator. The capacitor 27 is shunted by a trigger switch 28 which is opened at the initiation of running of the first blind 2. The both trigger switches 25, 28 remain closed as shown when the shutter is charged. The non-inverting input terminal of the amplifier 26 is connected to a terminal 29, to which a reference voltage VR is applied. The terminal 29 is also connected to the non-inverting input terminal of an operational amplifier 30, which forms a film speed information circuit. The inverting input terminal of the amplifier 30 is connected to the ground through resistor 31 and is also connected to the output terminal thereof through a variable resistor 32 which is utilized to establish a film speed. The output terminal of the amplifier 30 is connected to the inverting input terminal of an operational amplifier 33, which forms an exposure controlling comparator. The output terminal of the amplifier 26 is connected to the non-inverting input terminal of the amplifier 33, the output terminal of which is connected to a terminal 35, to which a supply voltage is applied, through an electromagnet 34 which is effective to maintain the second blind 10 in its charged condition.

Figure 5:
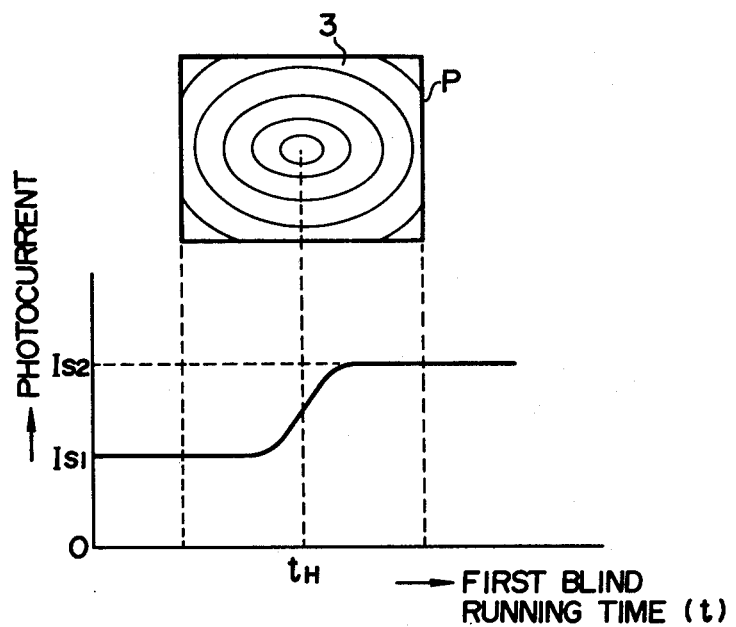
FIG. 5 graphically shows photometric input in terms of a varying photocurrent which is plotted against the running time of the first blind.

In operation, the depression of a shutter release button causes the movable mirror 1 (see FIG. 1) to move upward, whereby light begins to be incident on the transducer element 4, which therefore produces photocurrent Is. The amplifier 21 produces an output voltage which represents a logarithmic compression of the photocurrent Is. Since the trigger switch 25 remains closed at this time, the output voltage of the amplifier 21 is applied across the base and the emitter of the transistors 23, 24. It will be seen that since the output voltage of the amplifier 21 is equal to the voltage across the base and the emitter of the transistor 22, the collector current of the transistors 23, 24 which represents a logarithmic expansion of the output voltage of amplifier 21 is equal to the photocurrent Is. As the movable mirror has completed its upward movement and the first blind 2 begins to run at time t=0, the trigger switch 28 is opened. This permits the combined collector current of the both transistors 23, 24, that is, a current Ic=2Is, to flow through the integrating capacitor 27, thus commencing an integrating operation. At this time, the first blind 2 still covers the photosensitive surface of the film 3 and hence the light from an object being photographed which passes through the taking lens is reflected by the first blind surface to be incident on the transducer element 4, which therefore produces a photocurrent of a magnitude Is1, which is of nearly one-half the magnitude of the photocurrent Is2 which will be produced when receiving the light reflection from the film surface, as shown in FIG. 5. The conduction of transistors 23, 24 allows a photometric output current equal to the photocurrent Is1, which is in turn equal to twice the photocurrent Is1, to flow through the integrating capacitor 27. Thus, the current flow Ic is Ic=2Is=Is2. The amplifier 26 produces an integrated voltage $$Vc = VR + \frac{Ic}{C}t = VR + \frac{Is2}{C}t,$$

which is applied to the amplifier 33 (C represents the capacitance of the capacitor 27). On the other hand, the amplifier 30 produces a voltage VJ which represents an established film speed and which is equal to $$\left(1 + \frac{Rv}{R}\right)VR.$$

which is also applied to the amplifier 33. The amplifier 33 compares these voltages against each other. In the above notion, R and Rv represent the resistance of resistor 31 and variable resistor 32. Initially, the integrated voltage Vc has a low level and thus VJ>Vc. Accordingly, the amplifier 33 produces an output voltage of low level. Hence, the electromagnet 34 remains energized to constrain the second blind 10 in its charged condition.

As the first blind 2 continues running and the cap $2a$ reaches substantially the center of the picture frame P at time $t=t_H$, the trigger switch 25 is opened. At this time, one-half the picture frame P of the frame 3 is exposed, and accordingly the light reflection increases rapidly, causing a rapid increase in the magnitude of the photocurrent Is produced by the transducer element 4, as shown in FIG. 5. As the trigger switch 25 is opened, the transistor 24 is rendered non-conductive, and hence only the collector current Is of the transistor 23 flows through the integrating capacitor 27. At such time, the magnitude of the photocurrent Is will reach a value Is2 which is substantially equal to twice the magnitude Is1 of the photocurrent produced at the initiation of running of the first blind 2. Since only the transistor 23 conducts, the capacitor 27 is charged by the current Ic which is equal to Is2. It will be seen from the foregoing description that when the transducer element 4 receives light reflection primarily from the first blind surface and produces a photocurrent of a low magnitude Is1, the both transistors 23, 24 are rendered conductive to supply the current Ic equal to twice the photocurrent Is1 (or equal to Is2) to the integrating capacitor 27 while when the first blind 2 has run to a point where more than one-half of the picture frame P is defined by the film surface and the transducer element 4 receives light reflection primarily from the film surface to produce a photocurrent of the magnitude Is2 which is substantially equal to twice the magnitude Is1, the transistor 24 is rendered non-conductive while maintaining the transistor 23 conductive, thus supplying the current Ic (equal to the magnitude Is2) to the integrating capacitor 27. In this manner, the integrating capacitor 27 is supplied with a substantially constant current flow of Ic=-2Is1=Is2 from time t=0 or the initiation of running of the first blind 2 to the completion of running of the first blind 2, at which time the film surface across the picture frame P is entirely exposed.

As the integrating capacitor 27 is charged by the current Ic, the integrated voltage Vc continues to increase until Vc≧VJ after a given exposure period. Thereupon, the output voltage of the amplifier 33 inverts to its high level, deenergizing the electromagnet 34 to allow the second blind 10 to run, thus terminating the exposure of the film 3.

As a result of treating the surface of the first blind of the shutter so as to exhibit a reflectivity which is substantially one-half the reflectivity of the film surface (or less than the latter by −1 EV), the circuit arrangement which compensates for differential reflectivity can be greatly simplified as mentioned above, by providing a pair of parallel connected transistors 23, 24 which have idential responses and by turning one of the transistors, 24, off in interlocked relationship with the running of the first blind 2.

What is claimed is:

1. An apparatus for reflection photometry of a single lens reflex camera in which light from an object being photographed which passes through a taking lens and is reflected by both the surface of the first blind of a focal plane shutter and a film surface is determined to provide a photometric output which is then integrated to control an exposure period, said film surface having a predetermined reflectivity, said apparatus comprising:

a first blind of a focal plane shutter which exhibits a reflectivity which is approximately one-half the reflectivity of said film surface;

a photometric transducer element for photometry which is disposed to receive the light from an object being photographed which is reflected by the reflecting surface of the first blind and the film surface;

and a photometric circuit including a correction circuit which is operative to double a photometric output from the transducer element during the time from the initiation of running of the first blind until the first blind reaches substantially the center of an image field at which time the doubling action is interrupted; said correction circuit comprising an output doubling circuit for receiving said photometric output from said photometric transducer element and having first and second parallel output generating circuits, said first parallel output generating circuit being switchable for doubling the output of said output doubling circuit.

2. Apparatus for use with a single lens reflex camera, which camera includes a taking lens and a focal plane shutter, said apparatus comprising:

a photoelectric transducer element for photometry which is disposed to receive light from an object being photographed which light passes through said taking lens and is reflected off both a first blind of said focal plane shutter and a film surface exposed by said shutter, said film surface having a predetermined reflectivity, the reflectivity of said first blind being approximately one-half the reflectivity of said film surface; and a photometric circuit for measuring the output of said photoelectric transducer element and for causing a second blind of said shutter to run after a predetermined amount of light has been received by said photoelectric transducer element, said photometric circuit doubling said output of said photoelectric transducer element during a time from the initiation of a running of said first blind until said first blind reaches substantially the center of an image field of said shutter at which time said doubling action is terminated;

said photometric circuit comprising an output doubling circuit for receiving said photometric output from said photometric transducer element and having first and second parallel output generating circuits, said first parallel output generating circuit being switchable for doubling the output of said output doubling circuit.

3. An apparatus according to either one of claims 1 or 2 in which the reflecting surface of the first blind is formed to exhibit a reflectivity which is nearly one-half the spectral reflectivity of a standard color film throughout the entire wavelength range.

4. An apparatus according to either one of claims 1 or 2 in which the transducer element comprises a semiconductor element such as GaAsP having a negligibly small sensitivity to long wavelengths.

* * * * *